(12) United States Patent
Bono, Jr. et al.

(10) Patent No.: US 6,533,289 B2
(45) Date of Patent: Mar. 18, 2003

(54) WOVEN TUBULAR GASKETS AND GASKET-LIKE DEVICES WITH SPRING WIRE FASTENERS FOR OVENS

(75) Inventors: James J. Bono, Jr., Spring City, PA (US); Thomas L. Weil, Elverson, PA (US)

(73) Assignee: Davlyn Manufacturing Company, Inc., Spring City, PA (US)

( * ) Notice: Subject to any disclaimer, the term of this patent is extended or adjusted under 35 U.S.C. 154(b) by 0 days.

(21) Appl. No.: 09/894,288

(22) Filed: Jun. 28, 2001

(65) Prior Publication Data
US 2003/0001344 A1 Jan. 2, 2003

(51) Int. Cl.[7] .................................. F16J 15/02
(52) U.S. Cl. ................. 277/630; 277/628; 277/631; 277/637; 277/652
(58) Field of Search ................. 277/630, 631, 277/637, 644, 645, 652, 628

(56) References Cited

U.S. PATENT DOCUMENTS

| | | | |
|---|---|---|---|
| 3,578,764 A | | 5/1971 | Nunnally et al. |
| 3,812,316 A | * | 5/1974 | Milburn |
| 4,223,660 A | * | 9/1980 | Lang |
| 4,538,381 A | * | 9/1985 | Vogel |
| 4,822,060 A | | 4/1989 | Moyer et al. |
| 4,979,280 A | | 12/1990 | Weil |
| 4,986,033 A | | 1/1991 | Weil |
| 5,066,028 A | | 11/1991 | Weil |
| 5,107,623 A | | 4/1992 | Weil |
| 5,205,075 A | | 4/1993 | Moyer |
| 5,289,658 A | | 3/1994 | Lusen et al. |
| 5,341,601 A | | 8/1994 | Moyer |
| 5,395,126 A | | 3/1995 | Tresslar |
| 5,806,149 A | | 9/1998 | Schultz et al. |
| 5,918,885 A | * | 7/1999 | Radke, II |

* cited by examiner

Primary Examiner—Anthony Knight
Assistant Examiner—Enoch Peavey
(74) Attorney, Agent, or Firm—Akin Gump Strauss Hauer & Feld, L.L.P.

(57) ABSTRACT

A improvement to a gasket that includes an elongated seamless tubular member formed from at least a plurality of interwoven glass fiber yarn ends and a plurality of spring clip fasteners spaced along the tubular member, each fastener including a base located within the tubular member and an engagement portion extending outwardly through the tubular member away from the base. The free ends of the tubular member are coupled together at a joint so that the elongated tubular member forms a closed loop. A second tubular member is positioned around the joint, concealing the joint. The second tubular member may include one or more fasteners each having a base located between the elongated tubular member and the second tubular member and an engagement portion extending outwardly through the second tubular member away from the elongated tubular member. The second tubular member may be composed of at least a second plurality of glass fiber yarns interwoven together or a corrugated metal tube.

14 Claims, 5 Drawing Sheets

WOVEN TUBULAR GASKETS AND GASKET-LIKE DEVICES WITH SPRING WIRE FASTENERS FOR OVENS

BACKGROUND OF THE INVENTION

There has been a desire on the part of appliance manufacturers to develop a one-piece door construction in appliances such as ranges and microwave ovens to reduce fabrication costs. Gaskets would have to be attached to such doors from an exterior side using some type of mechanical fastening.

One approach for mechanically mounting such gaskets to one-piece doors has been disclosed in U.S. Pat. No. 4,822,060. That patent discloses providing a flexible, hollow cylindrical gasket with clip-type fasteners protruding along one side thereof. Such gaskets are formed from a hollow, tubular, knitted wire core and braided, glass fiber yarn outer jacket, somewhat similar to the cylindrical members of the old gasket assemblies. A single wire member is bent at several locations along its length to form a series of connected clip members and inserted through the core and jacket and generally captured. Other designs of the same assignee, Bentley-Harris, are disclosed in U.S. Pat. Nos. 5,205,075; 5,289,658; 5,341,601 and 5,395,126, all incorporated by reference herein.

U.S. Pat. No. 5,107,623 describes another type of gasket construction that includes an elongated core; a woven outer jacket surrounding the core and extending along the core; and a plurality of separate, individual fasteners spaced along the device. Each fastener has a base captured between the core and the woven outer jacket. Each fastener base is irremovably retained between portions of the core and the woven outer jacket adjoining one another and the base by the adjoining portions of the core and woven outer jacket. Each fastener further has an engagement portion extending away from the base and the adjoining portion of the core and through the adjoining portion of the woven outer jacket, protruding outwardly from the woven outer jacket. The individual fasteners are connected to one another in the device only through the capture of each fastener by the core and woven outer jacket.

Termination of either type of gasket is currently relatively unattractive. The ends of the gasket are simply brought together and overlapped in some fashion, either side by side or telescopically and fixed together with a suitable fastener such as a staple. Unless the appliance manufacturer can hide the joint thus formed in some way, for example, by covering it with part of a door panel, it will remain visible on the oven door where the exposed gasket end(s) will eventually begin to fray.

SUMMARY OF THE INVENTION

In an oven gasket including an elongated seamless flexible tubular member formed from at least a plurality of interwoven glass fiber yarn ends and a plurality of fasteners spaced along the tubular member, each fastener including a base located within the tubular member and an engagement portion extending outwardly through the tubular member away from the base, the improvement wherein two free ends of the tubular member are coupled together at a joint so that the elongated tubular member forms a closed loop, and a second tubular member is positioned around the joint, concealing the joint..

BRIEF DESCRIPTION OF THE DRAWINGS

The foregoing summary, as well as the following detailed description of preferred embodiments of the invention will be better understood when read in conjunction with the appended drawings. For the purpose of illustrating the invention, there is shown in the drawings embodiments which are presently preferred. However, it should be understood that the invention is not limited to the precise arrangements and instrumentalities shown. In the drawings.

DETAILED DESCRIPTION OF THE PREFERRED EMBODIMENTS

Figure 1:
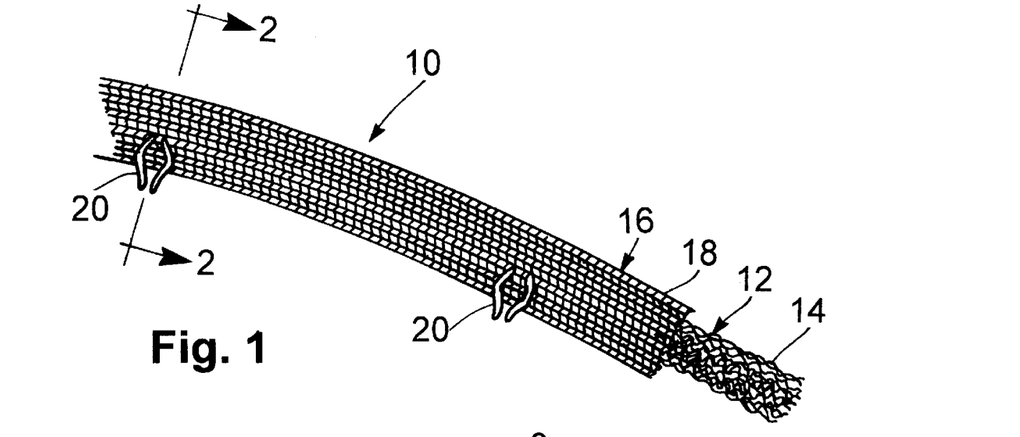
FIG. 1 is a perspective, diagrammatic, partially broken view of a preferred embodiment of a tubular gasket-type device of the invention.
Figure 2:
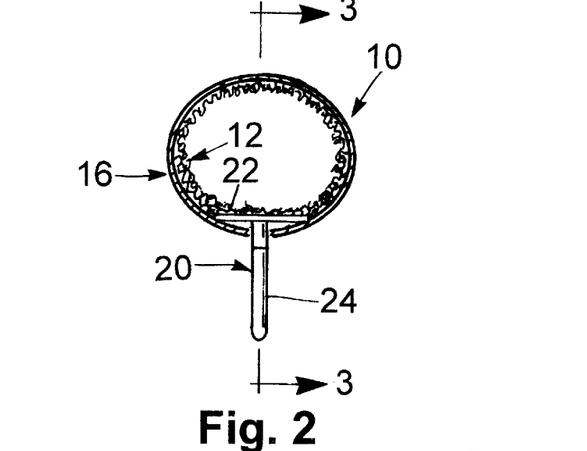
FIG. 2 is a diagrammatic, transverse, local cross sectional view of the device of FIG. 1 taken along the lines 2—2.
Figure 3:
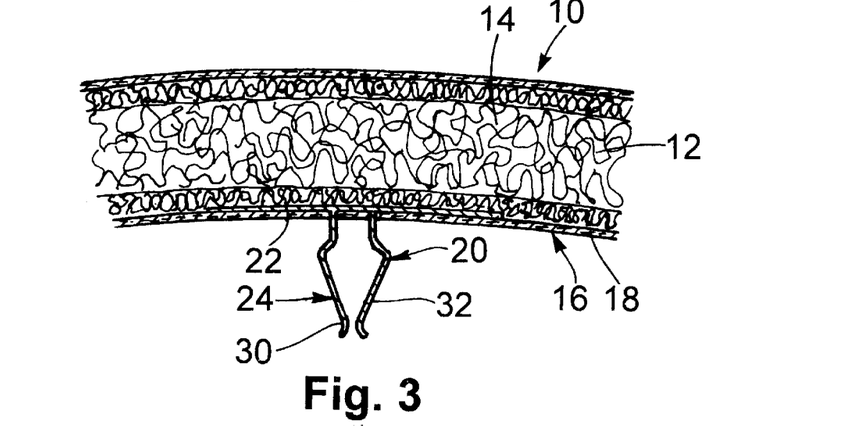
FIG. 3 is a diagrammatic, longitudinal, local cross sectional view of the device of FIGS. 1 and 2 taken along the lines 3—3 in FIG. 2.

Referring to the drawings, wherein like numerals are employed for the indication of like elements throughout, there is shown in FIGS. 1–3, a first preferred embodiment tubular gasket-type device 10. Referring to FIG. 1, the essential components of the device 10 include an elongated core 12, a woven outer jacket 16 surrounding the core 12 and a plurality of preferably separate, individual fasteners 20. The core 12 is preferably a continuous, elongated, seamless, flexible, tubular member with closed loop, normally circular transverse cross sectional shape, preferably knitted from a plurality of stainless steel or other spring tension wires 14 in a conventional fashion. The core 12 in FIG. 1 has been extended from one end of the jacket 16 of the device 10 for clarity. Woven outer jacket 16 is also a continuous, elongated, seamless, flexible tubular member of normally circular cross sectional shape that closely surrounds and extends along the core 12. Preferably the jacket 16 is interwoven, preferably braided, from a multiplicity of glass fiber yarn ends 18. The spring wire core 12 keeps the less resilient jacket 16 from collapsing under compressive load.

The device 10 includes a plurality of fasteners 20 that are preferably separate, individual spring clip-type fasteners or "clips" and are preferably spaced at predetermined intervals along the device 10. One such clip 20 is shown separately in FIG. 4. As can be seen in that figure, the clip includes a base 22 and an engagement portion 24 integral with the base 22 and extending substantially perpendicularly from one side thereof. The base 22 is substantially elongated between a pair of opposing ends 26 and 28 each of which is substantially rounded primarily to prevent cutting of the outer jacket 16. The engagement portion 24 of each clip includes a pair of adjoining, resiliently flexible spring arms 30 and 32, which can be compressed against one another to enable the arms 30, 32 to pass through an opening in a support member to which the device 10 is attached. Arms 30, 32 then return to their original, depicted configuration thereby securing the device 10 to the support member by an interference fit. As is best seen in FIG. 2, in this construction the base 22 of each clip 20 is captured between the core 12 and the outer jacket 16 with the engagement portion 24 extending transversely away from the base 22 and protruding outwardly through the outer jacket 16 between the yarn ends. In particular, the base 22 of each clip 20 is irremovably retained between portions of the core 12 and woven outer jacket 16 which adjoin one another and the base 22 by the adjoining portions of the core 12 and woven outer jacket 16. Thus, the base 22 of each clip 20 cannot be passed, for example through the core 12 into the hollow interior of the device 10 or through the outer jacket 16 without partially severing or otherwise removing or damaging at least one of the adjoining portion of the core 12 or jacket 16. The basic device 10 formed by the core 12, woven outer jacket 16 and clip-type fasteners 20 can be used as a gasket in a conventional or self-cleaning oven door.

The subject invention enjoys several advantages over the existing art was represented by the Bentley Harris patents identified above. First, the engagement arms 30 and 32 of the clips 20 do not have to be of the same diameter or width as the base. Indeed, as is shown with respect to the clip 20 of FIG. 4, the engagement arms 30 and 32 are cut from the central portion of the base 22 which is much larger than either of the arms 30 or 32. The enlarged base allows a greater area of the outer jacket 16 to be trapped between the base 22 of the clip 20 and the member receiving the engagement portion 24 of the clip 20. This reduces the tendency of the device 10 to roll around the engagement point and results in a more securely fastened device 10.

Figures 4, 5, 6, 7:
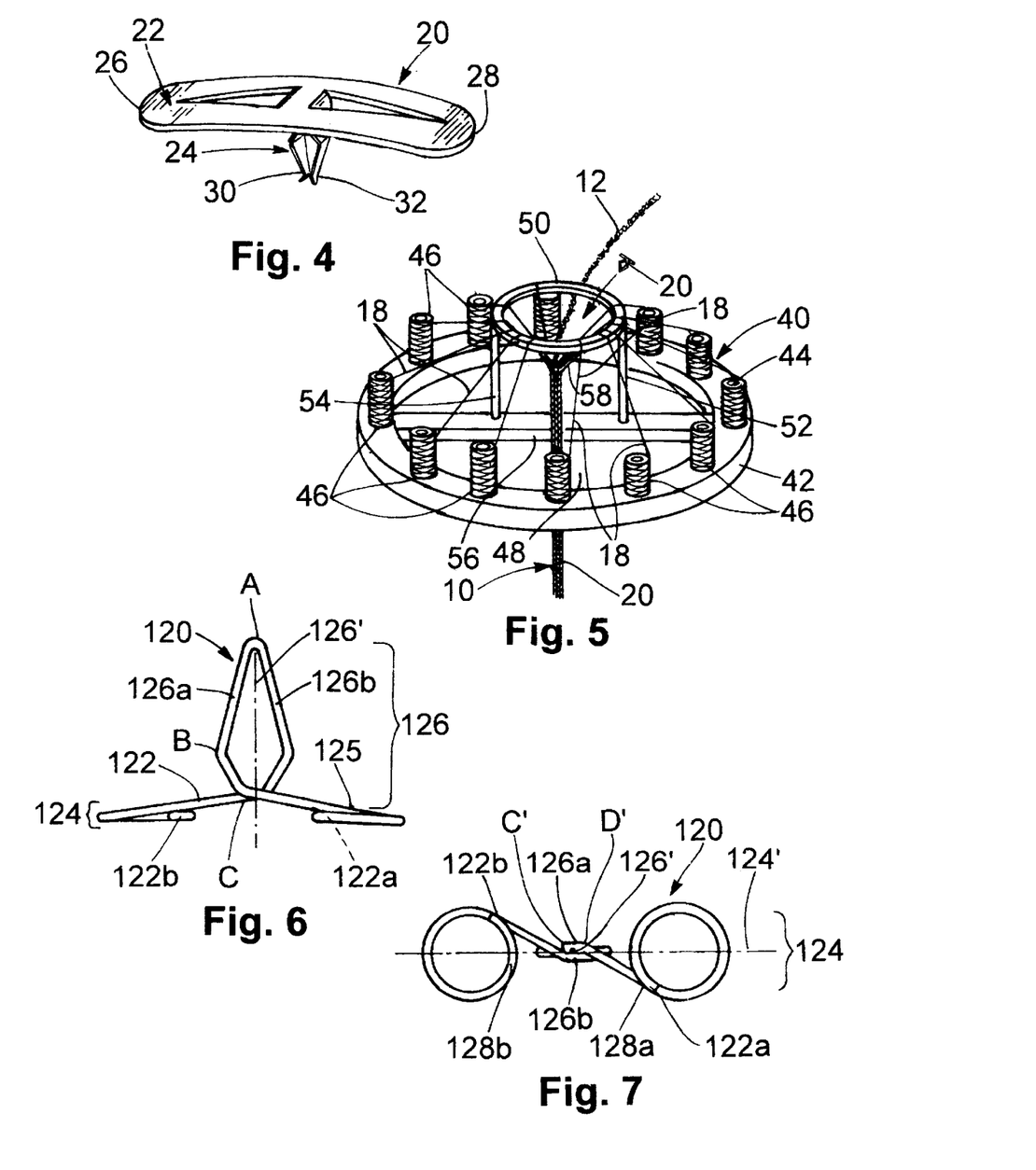
FIG. 4 is a diagrammatic, perspective view of a first fastener in the form of a punched, spring metal clip.
FIG. 5 is a diagrammatic view of a braiding machine configured to fabricate the devices of the subject invention in the preferred mode.
FIG. 6 is a side elevation of a presently preferred bent wire spring clip-type fastener.
FIG. 7 is a bottom plan view of the fastener of FIG. 6.

The depicted clips 20 may be formed by stamping from a planar sheet of spring metal. Moreover, since a variety of clips or other types of fasteners can be employed, the configuration of the engagement portion 24 and base 22 can be varied and the engagement force developed by the engagement portion 24 selected from a potentially wide range of attachment forces which can be achieved. The base 22 might be slightly longitudinally cambered as indicated to maintain the engagement portion 24 under tension when installed, thereby preventing movement between the clip 20 and the member receiving the clip. The base also can be cambered transversely or otherwise shaped in any desired way to optimize seating of the fastener against the gasket receiving oven door or other member.

FIGS. 6 and 7 depict diagrammatically a presently preferred, separate, individual fastener in the form of a bent wire spring clip, indicated generally at 120. The fastener 120 is made from a single length of at least partially hardened wire 122. The wire 122 is bent to define a generally planar base portion or "base" 124 and a generally planar, generally diamond-shaped engagement portion or dart 126 projecting transversely from one major planar side 125 of the base 124. The dart or engagement portion 126 is formed generally at the center of the length of wire 122 by bending the wire at three places (A, B, C) into the indicated generally diamond shape to form the pair of opposing side portions or "sides" or "arms" 126a, 126b of dart 126. The free portions of the wire 122 are bent at C' (FIG. 7) preferably to form an included angle greater than 130° and are extended past one another, side by side, the crossing defining the end of the dart 126 proximal the base 124. The remaining free end portions of the wire 122 are bent again (at D' in FIG. 7) generally in a plane perpendicular to the dart 126 so as to partially wrap about one another and to extend away from the dart 126 in opposing directions. The base 124 is completed by curling the remaining free end portions of the wire 122 into separate loop portions 128a, 128b, which preferably are circular closed loops. More particularly, the extreme opposing free ends or tips 122a, 122b of the wire 122 are each wrapped (counter clockwise in FIG. 7) under other respective portions of the wire 122 intermediate the ends 122a, 122b and the crossing, so as to overlap with such other intermediate portions and define opposing, completely closed portions 128a, 128b of the base 124. While each closed portion 128a, 128b is preferably an at least generally circular closed loop as shown, other closed perimeter shapes could be used and formed in other ways. It is further noted that the shape of each half of the wire 122 extending away form the medial bend "A" is identical. As a result, the first portion 128a is a reversed mirror image of the second portion 128b of the base 124 on opposing lateral sides of the central longitudinal axis 126' of dart 126 when the base 124 is viewed in plan as in FIG. 7. The preferred spring wire clip is described in greater detail in U.S. Pat. No. 5,806,149, which is incorporated by reference herein.

Fabrication of the device 10 is straightforward. The preferred, knitted wire core 12 is conventional, and its manufacture is known to those of ordinary skill in this art. Also, it is described at least to some extent in U.S. Pat. No. 3,578,764 incorporated herein by reference in its entirety. That patent discloses the beneficial uses of including a heat-resistant, flexible knitted metal wire core and a flexible, heat-resistant fabric jacket or cover, preferably of glass fibers, for use as an oven door gasket. Conventional elongated, tubular knitted wire members 12 can be obtained from such distributors as Montgomery Co., Windsor Locks, Conn. and ACS Industries, Woonsocket, R.I. A flexible knitted wire core 12 for an oven door gasket might be made of 7 mil, full hard 304 stainless steel wire in a continuous jersey knit having 12 wales and 13±1 courses/inch to form a continuous knit, cylindrically-shaped, hollow tube approximately ½ inch in diameter. The specification for a wire knitting machine to knit a hollow wire core like the core 12 would be ⅞ inch cylinder, 12 needles, 18 gauge, circular jersey knitting machine.

The method of providing the braided outer jacket 16 capturing the base 22 or 122 of the clip fasteners 20 or 120 against the core 12 is also straightforward. FIG. 5 depicts diagrammatically significant portions of a conventional braiding machine 40 which includes a base 42 mounting a multiplicity of spindles 44. Each spindle 44 receives a separate bobbin 46 of yarn 18. Only a few of the spindles 44 and bobbins 46 are depicted for clarity. The spindles 44 and bobbins 46 are driven along tracks (not depicted) in the base 42 in a weaving, maypole fashion so as to braid a continuous tubular outer jacket 16 around the core 12.

Such braiding machines can be obtained from a variety of commercial sources including Wardwell Braiding Machine Company, Central Falls, Rhode Island and Braider Manufacturing Company, Kokubun, Inc., Nakajimacho, Hamainatsu, Japan. The typical specification for such a machine is a 72 carrier braider, No. 2 butt, 36×100 gear ratio with 24 inch capstan. The typical specification for such a braided jacket might be, for example, 72 ends of yarn (fiberglass) size-150's, 10 count, 20±1 picks per inch.

The core 12 of the device 10 is fed through the center opening 48 in the base 42. The machine 40 thereupon braids the yarn ends 18 into the outer jacket 16 extending around and along the length of the core 12.

Normally in such machines, the core 12 would be fed upward and the fasteners inserted upwardly between the ascending core 12 and a cone formed by the multiplicity of yarns 18 being laid over that core 12 until some portion of the base 22 or 122 of the clip 20 or 120 is captured by the yarns 18 and held against the core 12.

To assist in positioning the clips 20, 120 or other fasteners, the braider 40 may be modified in a known manner depicted diagrammatically in FIG. 5 to add a central reversing ring 50 which enables the core 12 to be fed vertically downward, rather than upward, through the machine 40. The ring 50 is supported by a pair of arms 52 and 54 attached to a cross piece 56 fixedly supported in the central opening 48 of the base 42. In this way, a funnel 58 formed by the yarns 18 converging on the core 12 tapers downwardly onto the core 12, permitting the clips 20, 120 or other individual fasteners to be inserted downwardly among the converging yarns 18 from above, as depicted. This simplifies, to some extent, the feeding and positioning of the individual fasteners.

Preferably, the clips 20, 120 or other individual fasteners are inserted automatically by a suitably configured inserting mechanism. The mechanism might include, for example, a vibratory bowl having a vibrating reservoir at one end for orienting and feeding the clips 20 or 120 to the mouth of a stationary chute. The chute can extend from the vibrating reservoir towards the reversing ring of the braider and terminate at a point close to where the braided funnel 58 of glass fiber yarns contacts the core 12. An escapement, for example, may be provided to release one clip at a time down the chute. The clip 20, 120 is held at the lower end of the chute with the base portion of the clip contacting or nearly contacting the core and the engagement portion of the clip nearly contacting the individual yarns tapering together in the funnel 58. The clip at the end of the chute can thereafter be pushed between the converging core and yarns 18 forming the descending funnel 58 by suitable means, such as a solenoid-operated plunger which is timed for operation of the braider and/or the core feeder.

After braiding, the glass fiber outer jacket 16 of the device 10 can be heat treated and/or colored, if desired, in a conventional fashion. However, the devices 10 can also be treated as follows. Individual yarns 18 of outer jacket 14 can be coated, preferably at an individual yarn level, with a polymeric material in the form of a silicone resin coating to provide color to the outerjacket 14. The silicone resin coating is preferably one which resists temperatures up to at least 800° F. (about 427° C.), without color change or other adverse deterioration including loss of adhesion, for use with self cleaning electric ovens. One suggested coating is Dow Corning® 1-0469 waterborne resin, which is an anionic emulsion of a medium-hard phenylmethyl silicone resin. Alternatively, Dow Corning® 1-0468 waterborne resin, which is an anionic emulsion of a soft phenylmethyl silicone resin and which resists temperatures to about 1,200° F. (560° C.), can be used where higher temperature resistance is required or desired. The particle size of the resins in these emulsions is less than 700 nanometers.

Preferably, the silicone resin coating is applied as a water based emulsion containing resin solids. The emulsion is formed using conventional equipment normally used for preparing latex coatings and paints. The emulsions identified above are supplied at a concentration of about sixty percent by weight of resin solids. It is suggested that this concentration be reduced to about five percent or less of resin solids by the addition of water. One quart of supplied emulsion (sixty percent solids) is suggestedly added to five gallons of water to provide about a three percent by weight concentration of resin solids in the emulsion. This not only reduces initial material costs, it further reduces the loss due to burn-off, which typically occurs when the resin solids are heated above 300° F. To adhere the resin to the device 10, the device 10 is coated with the silicone resin emulsion, preferably by being immersed in the silicone resin emulsion. If the device 10 is fabricated in continuous lengths, the lengths can be continuously passed through a trough or other appropriate reservoir to coat the outer jacket. Alternatively, any other method of applying a liquid coating, including brushing, rolling, spraying, etc., can be used.

After initially coating, the liquid portion of the emulsion on the outer jacket is driven off, suggestedly by drying at a maximum temperature below that at which burn off occurs, typically less than about 300° F., and then heat curing at a minimum temperature at which at least partial burn off does occur, typically above 300° F. Burn off is characterized by smoke being generated. It is further believed at these temperatures that at least some of the silicone resin is converted to silicon, which bonds to the glass. More specifically, the coating 74 is suggestedly first dried at room temperature to the point where the coating does not rub off by ordinary handling. The remaining emulsion coat the individual yarns. It then is heat cured for approximately thirty minutes or more at approximately 450° F. (232° C.) to achieve at least partial burn off. Where being installed in self-cleaning ovens, the final part or all of the heat curing step can be performed by the ultimate purchaser when first using the oven in the self-cleaning mode. The cured silicone resin provides a permanent solid coating affixed to the individual yarns 18 forming the outer layer 16. The coating 74 is provided in this way in an amount which is insufficient to obscure the individual yarns of the outer jacket 14 from one another, thus allowing the observer to still discern the individual yarns in the braid or other weave used. The coating 74 is also flexible to flex with the device 10 during use as an oven gasket but provides a set to the gasket 10 to minimize fraying of the glass fiber yarns at the free ends of the gasket.

Gray to black color can easily be added to the coating 74 by the addition of graphite in varying concentrations to the diluted emulsion. For example for the quart of resin concentrate in five gallons of water (1 to 20 ratio), sixty grams of added graphite solids will impart a light gray to silvery color to the coating and the outer jacket 14. Suggestedly, a colloidal graphite suspended in water can be used. The addition of six hundred grams graphite (solids) imparts a very dark gray to black color to the coating and outer jacket 14. Different shades of gray in between can be achieved by intermediate concentrations of graphite.

Figure 8:
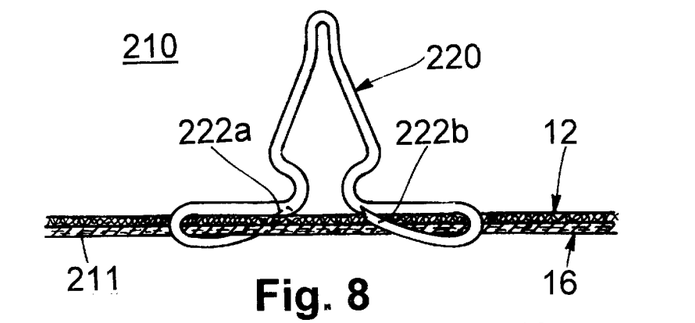
FIG. 8 is a partially broken away side elevation illustrating a second form of construction for woven inorganic tubular gaskets with spring wire members.

FIG. 8 depicts yet another form of construction in which individual fasteners 220 have a pair of free ends 222a, 222b, which are used to pierce the elongated flexible tubular member whether that member is formed by a hollow tubular core 12, a woven hollow tubular jacket 16 or a core 12 and woven outer jacket 16, and the ends 222a, 222b turned back into the sidewall 211 of the tubular member 210 to secure each separate fastener 220.

Figure 9:
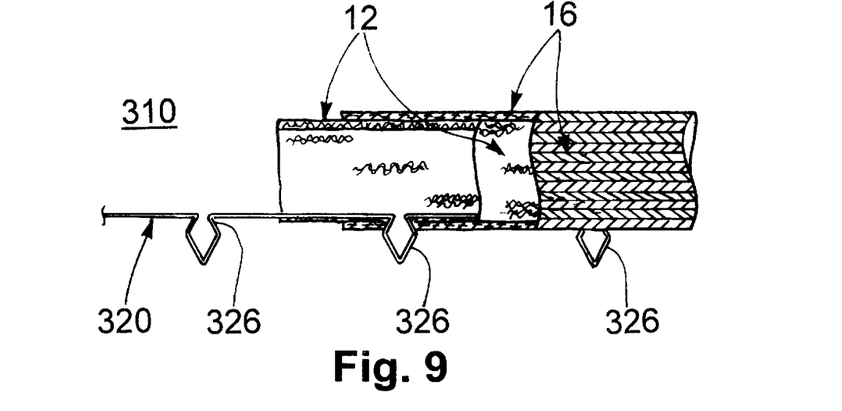
FIG. 9 is a schematic view of a third type of spring wire clip construction for use with a third form of tubular gaskets.

FIG. 9 depicts another form of construction. A gasket device 310 includes an elongated core 12 preferably of knitted spring steel wire and a surrounding woven outer jacket 216, preferably braided from a plurality of fiberglass yarn ends and a continuous bent spring wire form 320 including a plurality of integrally formed protrusions 326 which are passed through the wires or other members forming the inner core 12 and the fiberglass yarns or other members forming the woven outer jacket 16. More details regarding this construction can be found in U.S. Pat. No. 4,822,060 incorporated by reference herein in its entirety.

Figure 10:
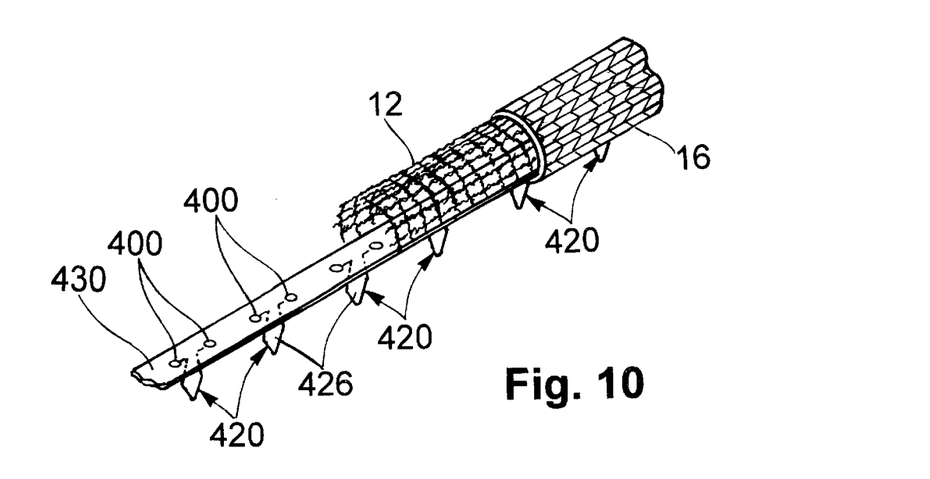
FIG. 10 is a schematic view of a fourth type of spring wire clip construction for use with a fourth form of tubular gaskets.

FIG. 10 depicts yet another form of construction. Gasket device 410 includes an inner core 12 and woven outer jacket 16 in which a plurality of individual fasteners 420 are first secured to a strip 430 by passing free ends of the fasteners 420 forming their bases through pairs of holes 400 in the strip. The strip is then inserted into the hollow tubular core 12 and jacket 16 and the engagement portions or darts 426 of the fasteners pushed through the interwoven ends forming the inner core 12 and outer woven jacket 16.

In addition, the continuous bent wire form 320 and the individual clips 20, 120, 220 and 420, other fasteners can be used with a single hollow tubular member interwoven (i.e., braided or knitted) from a mixture of glass fiber yarn ends and wire ends in the manner disclosed in U.S. Pat. No. 5,395,126, also incorporated by reference herein.

Figure 11:
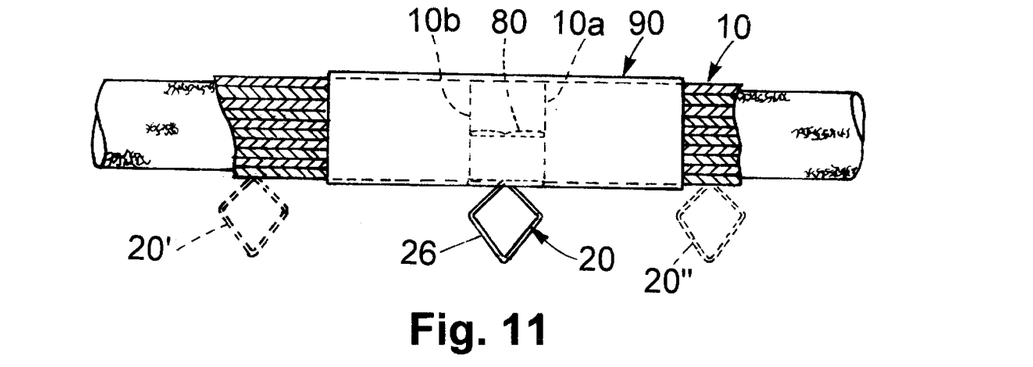
FIG. 11 depicts a tubular gasket incorporating a first form of the present invention.

FIG. 11 depicts the improvement of the present invention in which the free ends 10a, 10b of the device 10, or similar free ends of devices 210, 310, 410, etc. or any other similar elongated seamless flexible tubular gasket member, are coupled together at a joint indicated in phantom generally at 80 and secured together by suitable means such as a staple 82 or other fastener or fastening to form a closed loop oven gasket. The ends 10a, 10b may be telescoped or overlapped as indicated or butted together. The core 16 may be removed from one of the ends 10a, 10b to permit the outer jacket of that end to be compressed and telescoped into the core and jacket at the other end. Also, the core may be removed from both ends of the outer jacket to telescope or overlap or the ends may simply be overlapped and compressed and held in compression by the staple or other fastening. According to the invention, a second tubular member 90 is positioned over the joint 80 so as to cover the joint and joined ends 10a, 10b of the device 10. The second tubular member 90 may mount at least one separate fastener 20 (or 120, 220, 320, 420, etc.) having a base 22 located between the elongated tubular member 10 and the second tubular member 90 and an engagement portion 26, which can be seen, extending outwardly through the second tubular member 90 and away from the elongated tubular member 10. This construction permits a relatively short length second tubular member to be slipped over one of the two free ends 10a, 10b before the joint 80 is made and then slipped around the joint 80 after the free ends are joined together.

Figure 12:
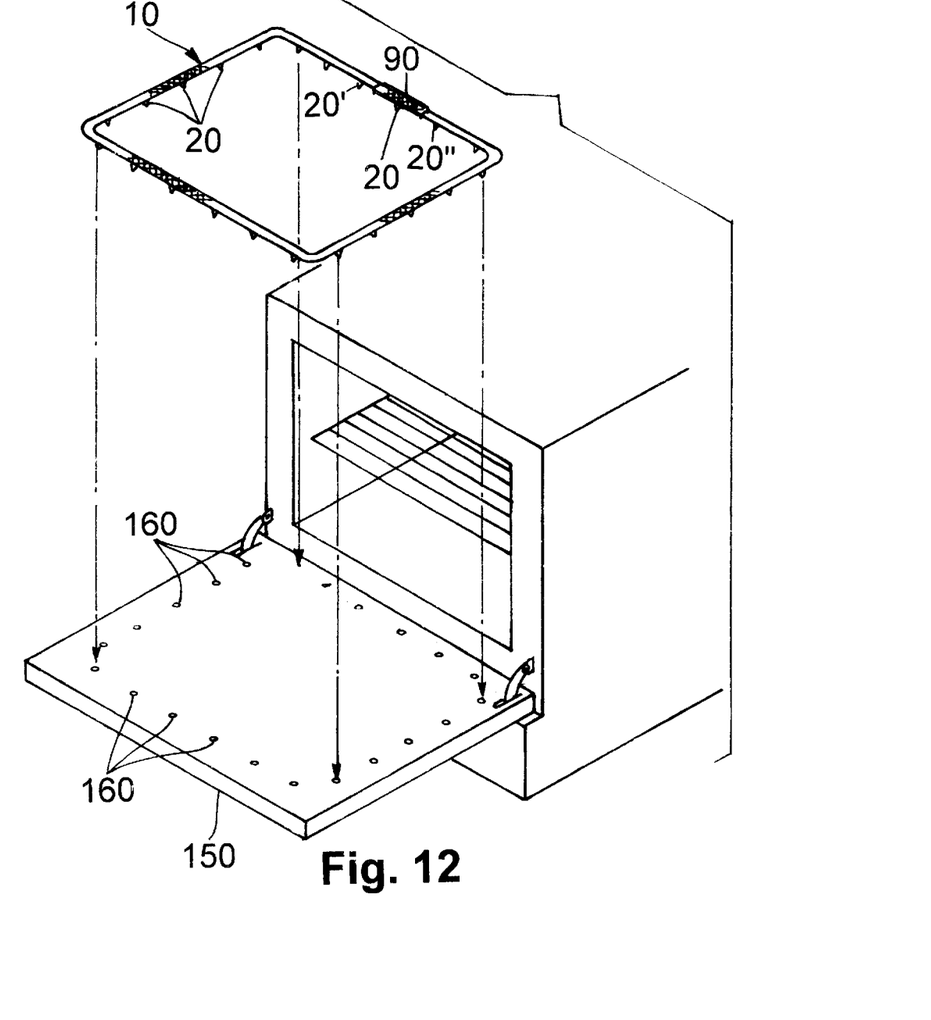
FIG. 12 depicts schematically a tubular gasket with spring wire clips and incorporating the first form of the present invention being mounted to an oven door.

Referring now to FIG. 12, the device 10 formed into a closed loop with second tubular member 90 is mounted in a conventional fashion to an oven door 150 with the engagement portion 26 of each fastener including any fasteners provided on the second tubular member 90 mating with holes 160 or other engagement mating positions provided in the door 150. The use of the other disclosed devices 210, 310, 410, etc. with second tubular member 90 would be in a conventional fashion by inserting the clips 20 (or 120, 220, 320, etc.) or other provided fasteners into holes 160 or other suitable receptacles.

Also or in the alternative to using fasteners on the second tubular member, the second tubular member 90 can be cut to a length sufficient to extend between the two clips 20' and 20" projecting from the tubular member 12 immediately adjoining the joint 80 (see FIG. 12) and trapped by the two clips 20', 20" so as to always span the joint 80 no matter where the second tubular member 90 is positioned between the two clips 20', 20" (or other fasteners). Preferably, the joint 80 is generally centrally located between two clips that immediately adjoin the joint 80 on either side of the joint 80 so that the tubular member 90 needs to have a length only slightly greater than the length of one of the free ends it is slipped over before the joint is made. The second tubular member would be slightly longitudinally compressed to expose the free end of the tubular member on which it is slipped to make the joint.

Figure 13:
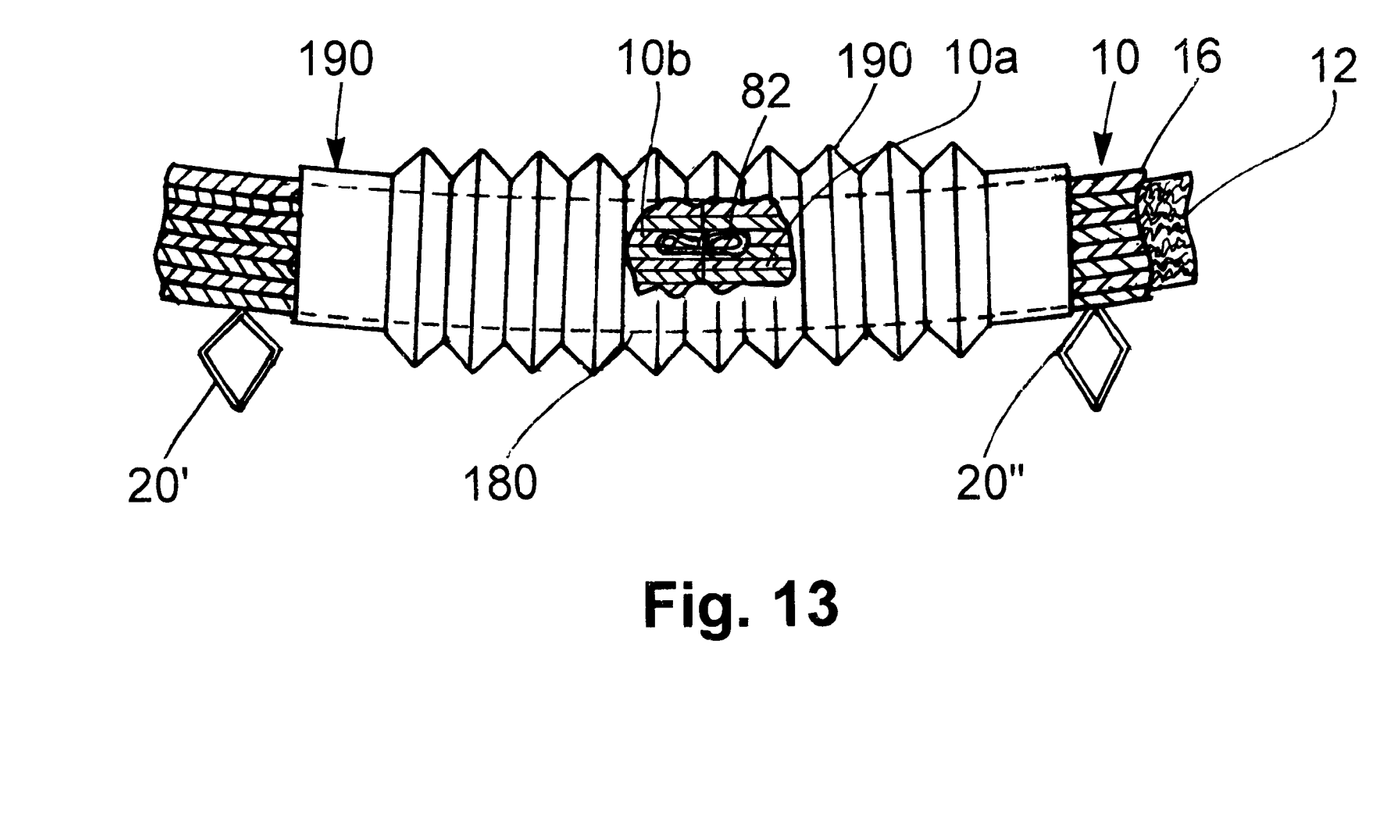
FIG. 13 depicts a tubular gasket incorporating a second form of the present invention.

Glass fiber second tubular members 90 can be cut from continuous lengths of tubing if used without their own fasteners or made in the same way as devices 10 if used with fasteners. The hollow inner core 12 would be pulled from the devices 10 after fabrication. Alternatively, the fasteners may be fabricated directly into a woven member (e.g. 16) through which the fastener extends in the same way that fasteners 20, 120 are fabricated into outer jacket 16. After fabrication and silicone treatment, if desired, the second tubular members can be cut to length. Second tubular members 90 can also be made from other materials having sufficiently high temperature resistance. For example, second tubular members might be made from thin metal tubing 190 with corrugations 192 along some of their lengths as indicated in FIG. 13 or along all of their lengths.

It will be appreciated that devices of the subject invention can be provided in a wide variety of sizes. While knitted wire is preferred as the core material for strength, flexibility, light weight and temperature resistance, other type of hollow and solid cores and core materials can be used. Glass fiber yarn is similarly preferred as the outer jacket material for low cost, high temperature capacity and density which permits a substantially air tight jacket to be made. Other flexible, inorganic materials with sufficient high temperature capacity to function in ovens, particularly self-cleaning oven applications could be used.

While various embodiments of the invention have been disclosed, and modifications thereto suggested it will be recognized by those skilled in the art that changes could be made to the above-described embodiments without departing from the broad, inventive concept thereof. It is understood, therefore, that this invention is not limited to the particular embodiments disclosed, but is intended to cover any modifications which are within the scope and spirit of the invention, as defined by the appended claims.

What is claimed is:

1. In an oven gasket including an elongated seamless flexible tubular member formed from at least a plurality of interwoven glass fiber yarn ends and a plurality of fasteners spaced along the tubular member, each fastener including a base located within the tubular member and an engagement portion extending outwardly through the tubular member away from the base, the improvement wherein two free ends of the tubular member are coupled together at a joint so that the elongated tubular member forms a closed loop, and a second tubular member is positioned around the joint, concealing the joint.

2. The improvement of claim 1 further characterized by at least a separate spring clip fastener having a base located between the elongated tubular member and the second tubular member and an engagement portion extending outwardly through the second tubular member away from the elongated tubular member and the base.

3. The improvement of claim 1 wherein the second tubular member is trapped on the elongated seamless tubular member between two of the plurality of fasteners adjoining either side of the joint so as to always cover the joint.

4. The improvement of claim 1 wherein the second tubular member is formed from at least a second plurality of glass fiber yams interwoven together.

5. The improvement of claim 1 wherein the second tubular member is a tube formed with corrugations.

6. The improvement of claim 1 further comprising a flexible core member within the elongated tubular member.

7. The improvement of claim 1 wherein the second tubular member is seamless.

8. The improvement of claim 1 wherein the second tubular member is preformed before mounting to the elongated member.

9. In an oven gasket including an elongated seamless flexible tubular member formed from at least a plurality of interwoven glass fiber yarn ends and a plurality of fasteners spaced along the tubular member, each fastener including a base located within the tubular member and an engagement portion extending outwardly through the tubular member away from the base, the improvement wherein two free ends of the tubular member are coupled together at a joint so that the elongated tubular member forms a closed loop, and a second tubular member slidably mounted on the elongated tubular member so as to be positionable to conceal the joint.

10. A continuous loop gasket comprising:

an elongated seamless flexible tubular member having at least two ends, the member being formed from at least a plurality of interwoven fiber yarns, wherein the ends of the rope are brought together to form a joint, and a second flexible seamless tubular member positioned around the joint formed by the two free ends of the length of rope.

11. The gasket of claim 10 wherein the flexible tubular member comprises a seamless woven outerjacket and a resilient wire core within the outer jacket.

12. The gasket of claim 11 wherein the woven outerjacket is braided.

13. The gasket of claim 10 wherein the second flexible seamless tubular member is cut from a continuous length of tubing.

14. The gasket of claim 10 wherein the fibrous yarns are at least essentially glass fiber by content.

* * * * *